Figure 1:
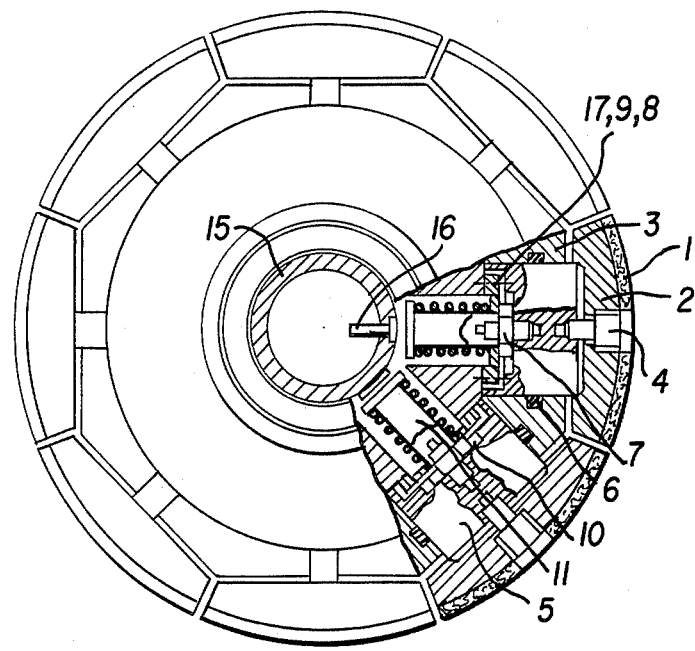

United States Patent [19]

Branislav et al.

[11] Patent Number: 4,729,463

[45] Date of Patent: Mar. 8, 1988

[54] RADIAL FRICTION COUPLING WITH SHOES

[75] Inventors: Bilen Branislav, Belgrade; Nedeljkovic' Miloje, Novi Belgrade, both of Yugoslavia

[73] Assignee: Technical Sciences Institute of the Serbian Academy of Sciences and Art, Belgrad, Yugoslavia

[21] Appl. No.: 936,190

[22] Filed: Dec. 1, 1986

[30] Foreign Application Priority Data

Feb. 21, 1986 [YU] Yugoslavia ............................ 264/86

[51] Int. Cl.$^4$ ............................................. F16D 13/16
[52] U.S. Cl. .................................. 192/76; 192/85 AT; 188/365
[58] Field of Search .............. 192/76, 85 AT; 188/78, 188/79, 340, 365

[56] References Cited

U.S. PATENT DOCUMENTS

| | | | |
|---|---|---|---|
| 2,333,682 | 11/1943 | Schneider | 192/85 AT |
| 2,393,010 | 1/1946 | Arnold et al. | 192/85 AT |
| 2,538,997 | 1/1951 | Weiland | 188/365 |
| 2,628,486 | 2/1953 | Huff | 192/85 AT |
| 2,719,620 | 10/1955 | McDonald | 192/85 AT |
| 2,961,074 | 11/1960 | Oswalt | 188/78 |

FOREIGN PATENT DOCUMENTS 821808  4/1981  U.S.S.R. .......... 192/85 AT

Primary Examiner—Rodney H. Bonck
Assistant Examiner—David A. Testardi
Attorney, Agent, or Firm—Shlesinger, Arkwright & Garvey

[57] ABSTRACT

The invention concerns a radial coupling with shoes, of a simple structure, reliable in operation, and which is engaged and disengaged without delay. The coupling comprises a body in which are provided several chambers. The chambers are connected by means of pipes with a source of pressurized fluid. The body is fixed on the axis of a winch. Movable pistons are disposed in each chamber and are loaded with return springs. Supports are disposed on each piston and each support carries a frictional covering.

5 Claims, 2 Drawing Figures

RADIAL FRICTION COUPLING WITH SHOES

The object of the present invention is an engaging-disengaging radial friction coupling with shoes for transmitting high torques in the sphere of low numbers of revolutions, and with remote control which will be of a simple structure, very reliable in operation, and which will engage and disengage without delay, by using radially movable hydraulically driven pistons.

The engaging-disengaging friction couplings with shoes (the shoes move in the radial direction) have been known for a long time because of known advantages, among which the relief from axial force is worth mentioning. The known embodiments of such couplings are the DOHMEN-LEBLANC coupling, as an old solution, and the PNEUMAFLEX coupling, as the latest solution. In relation to couplings with axial displacement of fricional surfaces, the couplings with radial displacement developed more slowly, because of problems in the transmission of radial force for activating the friction shoes.

In former couplings, for activating the shoes, axial force is used which, through a mechanism is transformed into a radial force displacing the shoes radially. Today such couplings are used more and more rarely.

In the latter couplings, the radial force is transmitted directly onto the shoes through a specially reinforced rubber in the form of a torus into which air under pressure is fed. This coupling is reliable and efficient, but very expensive and can be produced only by specialized firm engaged in rubber processing.

Accordingly, the object of the invention is to provide a friction coupling of cheap and simple construction, reliable in operation, where engaging and disengaging will be without delay.

The novel solution of the radial friction coupling with shoes (which move radially) is based on the same principles upon which the existing couplings with shoes are based, i.e. that the shoes move in the radial direction and press against cylindric frictional surfaces of the part onto which the torque is transmitted.

The novelty is in the structural solution of the coupling, the basic idea being the following:

That hydraulic oil be used for the remote control of the shoes and be fed under pressure into the casing of the coupling and that pistons which move in the casing of the coupling in the radial direction under oil pressure be used for transmitting the radial force pressing the shoes against the friction surface.

In this way a coupling with shoes which is structurally different from all the existing ones has been created. It is dependable, reliable, simple, and cheap to produce.

The new engaging-disengaging radial friction coupling with shoes and remote, hydraulic control, is in principle intended for transmitting high torques in the sphere of low numbers of revolutions. It is primarily intended for building into all types of winches, for which remote control of the coupling is requested, and for all other cases wherein torque transmission at low numbers of revolutions is requested.

The invention will be described in more detail in the text that follows, with reference to the drawings, in which:

FIG. 1 presents a coupling according to the invention in cross section, and

Figure 2:
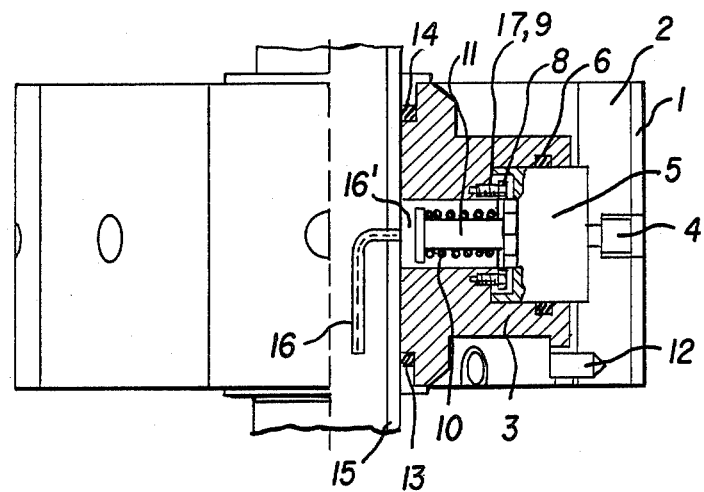

FIG. 2 is a partial longitudinal section of FIG. 1

The coupling consists of a body 3 keyed on the axis 15 of the winch. Piston 5 are placed into said body 3 and can be moved in the radial direction. Said pistons 5 are located in chambers 16' which are connected through pipes 16 to the source of fluid under pressure. Incidentally, the number of pistons 5 can be arbitrary, i.e. more or fewer than eight. Pistons 5 carry supports 2 for the frictional coverings 1. By means of pipes 16, oil is fed into the chambers 16' and acts simultaneously on all the pistons 5, displacing them radially, along with the supports 2 and coverings 1.

Supports 2 rest on the inside surface of the drum of the winch, and through the frictional surface of the covering 1 they transmit the torque from axis 15 of the winch drum. It is assumed that each piston 5 transmits $\frac{1}{8}$ of the coupling torque. The purpose of springs 10 is to disengage the coupling by moving the pistons 5 in the radial direction towards the center, when they are freed from oil pressure in the chambers 16'.

The sealing of the chamber 16' is achieved by means of seals 6 and 14. The springs 1o are held by supports 9 and 17, which are fixed on the body 3 of the coupling by means of screws 8. Support 2 of the frictional covering 1 is fixed by means of bolt 4 on piston 5, and by means of bolt 12 it is prevented from turning.

We claim:
1. A friction coupling, comprising:
(a) a rotatable shaft;
(b) a body keyed to said shaft and having a plurality of chordally disposed axially extending sides circumferentially disposed thereabout, each side contiguous with and disposed between two adjacent sides;
(c) a plurality of chambers disposed within said body, said chambers being equiangularly disposed apart and each chamber defining an axis transverse to said shaft and each chamber having a first end opening contiguous with said shaft and a second end opening extending through the associated side;
(d) first seal means sealing each chamber to said shaft;
(e) fluid duct means disposed in said shaft, said duct means opening into the first end portion of each chamber for supplying pressurized hydraulic fluid thereto;
(f) each chamber having a first diameter portion extending from the associated first end opening and an enlarged second diameter portion extending from the associated second end opening;
(g) a plurality of pistons, each piston slidably mounted within one of said second diameter portions and having an end portion disposed radially outwardly beyond the associated side;
(h) second seal means disposed about each of said pistons for sealing the associated chamber;
(i) first flange means disposed in each second diameter portion and overlying the associated first diameter portion;
(j) means extending radially from each piston toward said shaft and carrying second flange means radially inwardly spaced from said first flange means;
(k) spring means disposed about each radially extending means and between said first and second flange means for biasing each piston toward said shaft;
(l) a plurality of supports, each support secured to the end portion of one of said pistons and each support having a curvilinear periphery; and,
(m) a plurality of friction coverings, each friction covering secured to the periphery of one of said supports so that introduction of pressurized fluid into said chambers causes said pistons and thereby said friction coverings to move radially outwardly for engagement with a member and the absence of pressurized fluid causes said spring means to move said pistons and thereby said friction coverings radially inwardly for disengagement from the member.

2. The coupling of claim 1, further comprising
(a) second means extending radially from each side and engaged with the associated support for preventing turning thereof, each second means being spaced from the associated piston.

3. The coupling of claim 1, further comprising
(a) means for securing said first flange means contiguous with said first diameter portion.

4. The coupling of claim 1, further comprising
(a) an annular groove in said body contiguous with said shaft; and,
(b) said first seal means disposed in said groove.

5. The coupling of claim 1, wherein:
(a) said body has a substantially octagonal cross-sectional configuration.

* * * * *

UNITED STATES PATENT AND TRADEMARK OFFICE
CERTIFICATE OF CORRECTION

PATENT NO. : 4,729,463

DATED : March 8, 1988

INVENTOR(S) : Branislav Bilen and Miloje Nedeljkovic'

It is certified that error appears in the above-identified patent and that said Letters Patent is hereby corrected as shown below:

Title page Item [19] and [75] should read:

Inventors: Branislav Bilen, Belgrade;
Miloje Nedeljkovic', Novi Belgrade,
both of Yugoslavia Signed and Sealed this Twentieth Day of September, 1988

*Attest:*

DONALD J. QUIGG

*Attesting Officer*      *Commissioner of Patents and Trademarks*